US010173522B2

(12) United States Patent
Marini et al.

(10) Patent No.: US 10,173,522 B2
(45) Date of Patent: Jan. 8, 2019

(54) FILLING HEAD FOR AN OPERATING LIQUID TANK WITH A GAS AND LIQUID VALVE BODY

(71) Applicant: Röchling Automotive SE & Co. KG, Mannheim (DE)

(72) Inventors: Luca Marini, Besenello (IT); Ivan De Metri, Bolzano (IT); Fabrizio Chini, Isera (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 0 days.

(21) Appl. No.: 15/610,871

(22) Filed: Jun. 1, 2017

(65) Prior Publication Data
US 2017/0368927 A1 Dec. 28, 2017

(30) Foreign Application Priority Data

Jun. 22, 2016 (DE) ........................ 10 2016 211 160

(51) Int. Cl.
*B60K 15/035* (2006.01)
*B60K 15/04* (2006.01)
(Continued)

(52) U.S. Cl.
CPC ........ *B60K 15/03519* (2013.01); *B60K 15/04* (2013.01); *F16K 17/194* (2013.01);
(Continued)

(58) Field of Classification Search
CPC .............. B60K 15/03519; B60K 15/04; B60K 2015/03538; F16K 24/042
See application file for complete search history.

(56) References Cited

U.S. PATENT DOCUMENTS 4,630,749 A 12/1986 Armstrong et al.
9,631,586 B2 4/2017 Hagen
(Continued)

FOREIGN PATENT DOCUMENTS

DE 102013201237 A1 7/2014

OTHER PUBLICATIONS

German Search Report for corresponding DE 10 2016 211 160.4 dated Jun. 2, 2017, 11 pgs.
(Continued)

*Primary Examiner* — Jason K Niesz
(74) *Attorney, Agent, or Firm* — Rankin, Hill & Clark LLP

(57) ABSTRACT

A filling head for an operating liquid tank, in particular of a motor vehicle, comprising a filling tube with an inlet end, which lies farther away from the tank, and an outlet end, which lies nearer to the tank, the filling tube for conducting operating liquid in a filling direction from the inlet end to the outlet end, a venting arrangement with an inflow end, which lies nearer to the tank and an outflow end which lies farther away from the tank, which end is provided for passing of gas in a counter-flow direction with respect to liquid flowing in the filling direction, in a venting direction extending from the inlet to the outflow end, the venting arrangement is provided, at least in the area of its outflow end, separate from the filling tube, the venting arrangement has a valve with a gas valve body, which is movable between a closed position, in which a gas flow in a valve passage is prevented, and a passage position, in which the gas may flow in the valve passage past the gas valve body, the valve having a liquid valve body, which is movable between a blocking position, in which a liquid flow in the valve passage is blocked, and an open position, in which the valve passage past the liquid valve body is open.

20 Claims, 4 Drawing Sheets

(51) Int. Cl.
F16K 24/04 (2006.01)
F16K 31/22 (2006.01)
F16K 17/194 (2006.01)
B60K 15/03 (2006.01)

(52) U.S. Cl.
CPC ............ *F16K 24/042* (2013.01); *F16K 31/22* (2013.01); *B60K 2015/03289* (2013.01); *B60K 2015/03538* (2013.01); *B60K 2015/03557* (2013.01); *B60K 2015/03576* (2013.01)

(56) References Cited

U.S. PATENT DOCUMENTS

| | | |
|---|---|---|
| 2013/0269804 A1 | 10/2013 | Erdmann et al. |
| 2016/0201817 A1 | 7/2016 | Koukan et al. |
| 2016/0272062 A1 | 9/2016 | Marini et al. |

OTHER PUBLICATIONS

Espacenet Bibliographic data:DE102013201237 (A1), Published Jul. 21, 2014, 2pg.

FILLING HEAD FOR AN OPERATING LIQUID TANK WITH A GAS AND LIQUID VALVE BODY

The present invention refers to a filling head for an operating liquid tank, in particular of a motor vehicle, comprising a filling tube with an inlet end, which in the mounted state lies farther away from the tank, and an outlet end, which in the mounted state lies nearer to the tank, wherein the filling tube is provided for conducting operating liquid in a filling direction from the inlet end to the outlet end, and further comprising a venting arrangement with an inflow end, which in the mounted state lies nearer to the tank and an outflow end which lies farther away from the tank in the mounted state, which end is provided for passing of gas in a counter-flow direction with respect to liquid flowing in the filling tube in the filling direction, in a venting direction extending from the inflow to the outflow end, wherein the venting arrangement is provided, at least in the area of its outflow end, separate from the filling tube, wherein the venting arrangement has a valve with a gas valve body, which is movable between a closed position, in which a gas flow in a valve passage is prevented, and a passage position, in which the gas may flow in the valve passage past the gas valve body.

BACKGROUND OF THE INVENTION

Such a filling head is described in the successively published German patent application 10 2015 204 925.6. The gas valve body disclosed therein is coupled to a detection device, which detects if a portion of a filling neck of a dosing device is positioned inside the filling tube and which displaces, depending from the detection result, the gas valve body between its closed and open position.

From DE 10 2013 201 237 A1 a venting valve is known, in which a floating chamber is connected via a separate liquid conduit with the operating liquid tank. A filling tube is not provided in this venting valve.

In the floating chamber of the known venting valve, a floating body is positioned, which is connected via a sealing mount with a polymer sealing. The sealing mount is loosely positioned on the floating body in its movement direction.

If operating liquid flows through the separate liquid conduit into the floating chamber, the floating body is lifted, together with the sealing mount and the polymer sealing against the direction of gravitational force, until the polymer sealing closes a venting opening.

If the liquid level in the floating chamber falls again, the floating body moves back, due to its own weight, in the direction of gravitational force, to its original rest or standby position. In order to prevent a pressing of the polymer sealing against the venting opening due to a temporary gas overpressure generated in the floating chamber or in the tank, the floating body is provided with a sealing pin, which in its lifted position protrudes into a passage opening of the polymer sealing, closing the same. Since the polymer sealing is connected with the sealing mount and this in turn is connected with a vertical movement clearance with the floating body, the floating body may move downwards with respect to the sealing mount and therefore also to the polymer sealing, in the direction of gravitation when the polymer sealing is further pressed by a gas overpressure in the floating chamber against the venting opening of the valve housing. The sealing pin is drawn out from the passage opening of the polymer sealing, due to this relative movement provided by the clearance, so that gas may escape through the opening in the polymer sealing and therefore through the venting opening in the valve housing for pressure compensation. In this way, the gas overpressure in the floating chamber is reduced and the lifting of the polymer sealing from the venting opening is eased.

In the venting valve known from DE 10 2013 201 237 A1, the venting opening is always free for gas passage, when the floating body, due to gravitational force, is transferred into its lower position (standby position). From this position, the closing of the venting opening may only take place through a rise in the liquid level.

Both above described solutions have in common the fact that the outflow end of the venting arrangement may be spatially and functionally separate from the filling tube, so that, possible foul smelling gases may exit from the tank inner space and reach the outside, where these gases either cannot be perceived or can be perceived with such a delay by the operator filling the operating liquid, that the work of the operator on the vehicle is finished, before it can be disturbed by the smell of exhausted gases.

SUMMARY OF THE INVENTION

An object of the invention is to further simplify above said filling head, without limiting its functional scope.

This object, and others, is achieved, according to the invention, by a filling head of above said type, in which the valve is additionally provided with a liquid valve body, which may be transferred between a closed position, in which the flow of liquid in the valve passage is blocked, and an open position, in which the valve passage past the liquid valve body is open.

With the filling head of the invention, the valve may also be secured against an exhaust of operating liquid through the outflow end of the venting arrangement. Advantageously, the venting arrangement and the filling tube may, at least partially, be provided in the same housing, which leads to a compact embodiment of the filling head.

"Counterflow" means in this case a functional flow direction with respect to the filling direction. Gas flows in a counterflow when it flows from the operating liquid tank through the filling head into the environment, whereas the liquid flows through the filling head from the external environment into the tank. It is not required that both flow directions are spatially directly opposed. This strict limitation cannot be applied since according to a preferred embodiment the gas flowing in the venting direction should escape into the environment at a position different from the position where the introduction of operating liquid takes place, in order to prevent that a person filling the tank may be disturbed by the exiting gases.

In order to avoid that gas exits the operating liquid tank during normal operating phases, therefore possibly causing disturbing smells to spread into the environment surrounding the vehicle, it is provided that the gas valve body is preferably biased in the closed position, which is the rest or standby position. Fundamentally, it may be envisaged that the gas valve body is displaced into the passage position by a detection and control device, when the detection device detects that operating liquid is lead through the filling head to the tank or that at least a filling neck is introduced into the filling tube from the inlet end. Such a detection and control device may however be omitted, if the gas valve body is configured and placed in such a way that it may be displaced by a gas overpressure in the passage position on the side of the inlet end opposed to the outlet end. Due to the essentially known biasing force, which is exerted on the gas valve body biasing it in the closed position, the threshold gas overpressure may be set, which is required for displacing the gas valve body into the passage position. The force load of the gas valve body may be set in case of a biasing spring by selecting a spring with a predetermined spring hardness and/or by the weight of the gas valve body and/or by setting the friction between the gas valve body and a valve body enclosing the same and/or by dimensioning active surfaces, on which different pressures act, like the ambient pressure and the gas pressure in the filling head.

In this way, the gas valve body may function as an overpressure valve, which reaches the closed position, when no sufficient overpressure is present on the inlet end side.

The liquid valve body may, as an addition or an alternative, be biased in the opening position as the rest or standby position, so that a flow passage past the liquid valve body is essentially open, if the liquid valve body is displaced by a liquid rising to the outlet end into the closing position. The liquid valve body is biased in the opening position, as the rest or standby position, when at the inlet end a gas overpressure is present with respect to gas pressure at the outlet end.

In order to ensure the displacement of the liquid valve body by an operating liquid rising in the direction of the outlet end it may be envisaged that the liquid valve body has a density, which is greater than the density of the flowing gases at 20° C. and a pressure of 1013 hPa and lower with respect to the density of the operating liquid, for which the filling head is provided, measured at a temperature of 20° C. and a pressure of 1013 hPa. In this case, particularly interesting operating liquids are fuels, like gasoline, super-gasoline, or diesel fuel, or reduction liquids, like aqueous urea solutions, for reduction of nitrogen oxides in the discharge tract of a vehicle. Operating liquids for a motor vehicle may also be cooling mediums like water, which may be replenished in the motor vehicle through the inventive filling head.

The gas valve body and/or the liquid valve body may fundamentally be biased in their respective rest positions by suitable biasing devices, like springs and similar. The number of components required for providing the inventive filling head may however be reduced by the fact that the gas valve body and/or the liquid valve body may be displaced by gravity, preferably exclusively by gravity, in their respective rest positions.

Fundamentally it may be envisaged that the gas valve body and the liquid valve body are rigidly coupled to each other, so that the valve bodies may not be independently moved from each other. One and the same venting opening may be preferably opened and closed by each of the two valve bodies. The gas valve body may for instance rest on the venting opening due to being biased by gravity and may be lifted from the venting opening by overpressure and the liquid valve body may rest at a distance from the venting opening and may be pressed by the rising liquid against a sealing edge of the venting opening. When both valve bodies are coupled together for common movement, a rising of the liquid valve body causes a rising movement of the gas valve body from the venting opening.

As an alternative, both valve bodies, i.e. the gas valve body and the liquid valve body, may be adjusted or displaced independently from each other between their respective operating positions.

This leads to operating states in which the outflow end of the venting arrangement is closed only by the gas valve body, whereas the liquid valve body opens the outflow end for flowing therethrough, and/or in which the outflow end is completely closed by the liquid valve body, so that the position of the gas valve body is irrelevant.

The liquid valve body can preferably not be set in its closing position by the gas valve body, so that even when the gas valve body is moved to its passage position, the liquid valve body is not in its closed position. Also preferably the liquid valve body in its closed position does not only block the passage of liquid through the valve, but also of gas. The passage of the valve is therefore blocked by the liquid valve body independently from the position of the gas valve body, even for a gas flow.

In order to provide these different operating conditions, it is advantageously envisaged that the liquid valve body is positioned upstream in the venting direction of the gas valve body. The gas valve body and the liquid valve body preferably act on one and the same opening or conduit at the outflow end of the venting conduit, although on different sides of the same. Therefore an outlet conduit or an outlet opening is preferably positioned in the venting direction between the gas valve body and the liquid valve body.

The liquid valve body may therefore prevent not only the exit of operating liquid through the venting arrangement, but also the exit of gas through the venting arrangement.

In order to reduce the number of components required for building the inventive filling head it is preferred if the gas valve body and the liquid valve body are positioned inside a common valve housing. This may be provided in two or essentially in a plurality of parts, in order to facilitate the installation. The effect of both valve bodies on different sides of an outlet opening or conduit may be constructively provided in that a portion of the valve passage is formed on a, preferably integral, valve housing component, wherein the valve passage portion may be closed by the liquid valve body in a blocking area, preferably in a blocking area which is located in a more upstream position in the venting direction, more preferably at an upstream longitudinal end, depending on its operating position, and by the gas valve body, in a closing area, preferably in a closing area which is located in a more downstream position in the venting direction, in particular at a downstream longitudinal end, depending on its operating position.

The gas valve body may fundamentally be any valve body. However, it is preferably a mushroom-shaped valve body in order to provide a sufficient active surface area for a pressure acting on the same. In a preferred example, this greater active surface is an active surface, on which the ambient pressure outside the filling head acts.

The liquid valve body may comprise, in a constructively simple, but very effective way, a displaceable floating body and a membrane movable by the floating body. It is therefore sufficient if the sealing effect on the side of the liquid valve body is originated from the membrane, whereas the floating body is not required to have its own sealing function. It is therefore sufficient if it presses the membrane against a sealing seat, whereby the valve passage is blocked. The membrane may in turn be sufficiently soft or deformable, so that, in case of a pressure exerted by the floating body, which presses the membrane against a valve seat, due to a local deformation of the membrane, a complete sealing of the outflow end is obtained. The membrane may, to this effect, be made of silicon rubber, a thermoplastic elastomere, ethylene-propylene-diene-rubber (EPDM) and similar. The membrane is preferably connected to the floating body in a bidirectional movable way, so that it not only can be pressed by the floating body against a valve seat, but the floating body may remove the same from the valve seat.

In order to allow for such a sufficient deformation for sealing of the outflow end by the membrane, the valve seat, which interacts with the membrane, is formed on the side of the valve housing preferably by an edge protruding towards the membrane, so that in case the membrane contacts the edge itself, with only low lifting forces on the floating body, locally high pressure exist, which may cause a local deformation of the membrane.

The floating body itself may be provided with a channel arrangement, through which gas may flow through the floating body in the venting direction, in order to increase the previous transversal section of the valve formed by cooperation of both valve bodies, i.e. the gas valve body and the liquid valve body. In order to block the valve passage with the liquid valve body also for a gas flow, the channel arrangement, through which gas may flow, is preferably entirely located, in the venting direction, in an upstream position of the membrane.

Since above said valve arrangement, which is used in the inventive filling head, has in itself an inventive value, the present application also refers to a valve arrangement with a gas valve body, which may be displaced between a closed position, in which a gas flow in a valve passage is prevented, and a passage position, in which gas may flow past the gas valve body in the valve passage, wherein the valve arrangement further has a liquid valve body, which is movable between a blocking position, in which a liquid flow in the valve passage is blocked, and an open position, in which the valve passage past the liquid valve body is open and free. The valve arrangement may be subject to further development, as previously said in relation to the filling head.

The present invention also refers to a motor vehicle with a filling head, which is formed and developed as previously detailed, and with an operating liquid tank, which may be filled and vented through the filling head.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which form a part hereof and wherein.

DESCRIPTION OF PREFERRED EMBODIMENTS

Figure 1:
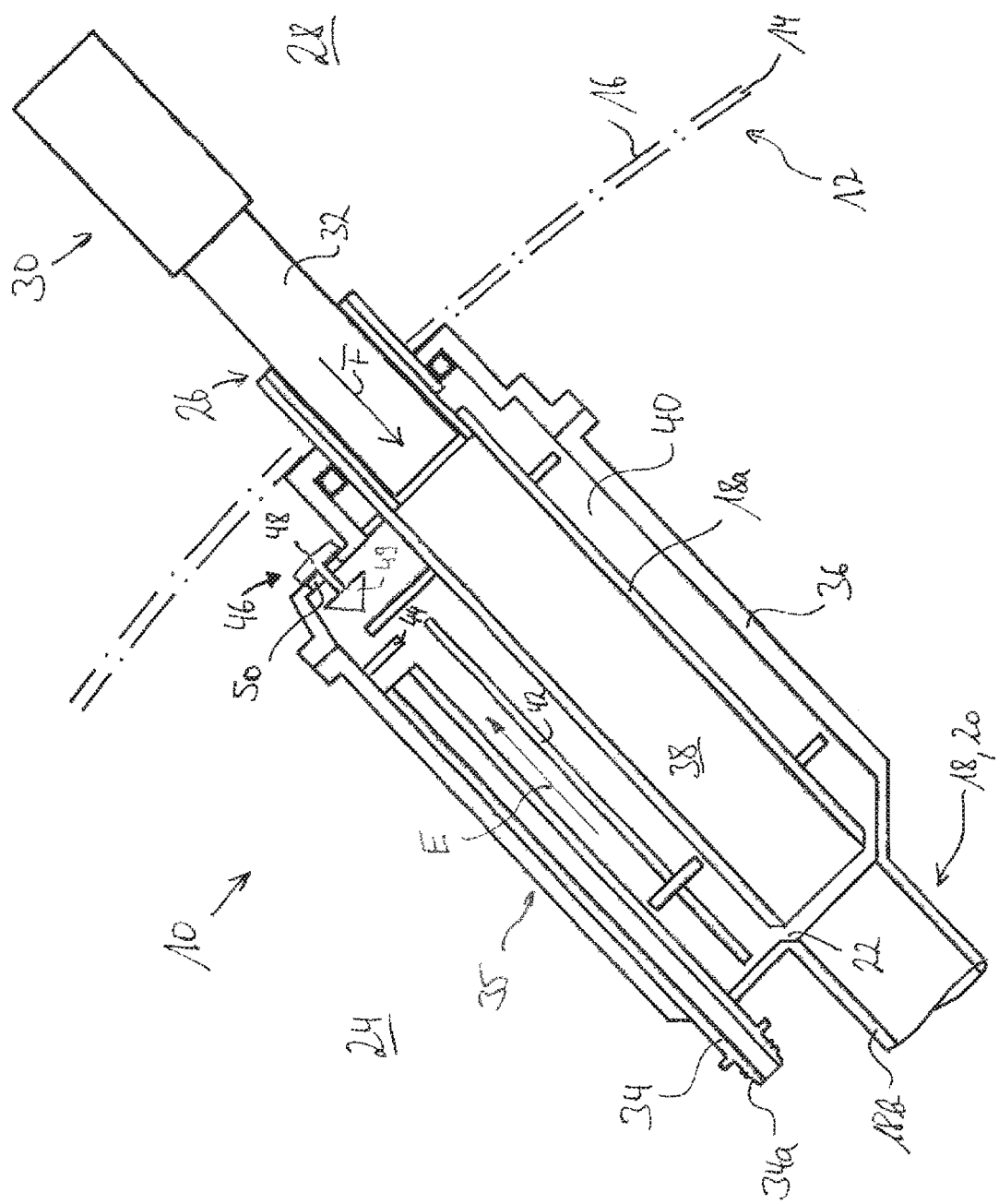
FIG. 1 shows a very schematic longitudinal sectional view of an inventive filling head.

Referring now to the drawings wherein the showings are for the purpose of illustrating preferred and alternative embodiments of the invention only and not for the purpose of limiting the same, FIG. 1 shows a simple very schematic longitudinal section of the filling head generally indicated by reference number 10. The filling head 10 is provided on a motor vehicle 12, which is shown in FIG. 1 only as a dot-dashed body-line 14, which represents the profile of a body sheet metal 16 in the plane of the drawing in FIG. 1.

The filling head 10 comprises a filling tube 18, which defines a filling tube conduit 20. The filling tube 18 in the example shown is preferably formed by multiple parts and has an upper filling tube 18a and a connected lower filling tube 18b, for example. Between the upper filling tube 18a and the lower filling tube 18b a gap 22 is formed, which is described in further detail in the following, and which provides venting for the filling tube conduit 20.

The lower filling tube 18b is on the vehicle inner side 24 of body 16. An inlet end 26 of the filling tube 18, more precisely the upper filling tube 18a, protrudes through the body 16 to the vehicle external side 28 of body 16.

In FIG. 1, a portion of a filling neck 30 is also shown, whose outlet end tube 32 is introduced to some extent through the inlet end 26 into the filling tube conduit 20. The filling neck 30 is used as ending part of a dosing device, not shown in FIG. 1, for delivering liquid in the filling direction along arrow F.

At the longitudinal end, opposed the inlet end 26 of filling tube conduit 20 the outlet end is positioned, which is not shown in FIG. 1. Liquid expelled from the filling neck 30 therefore flows from the inlet end 26 to the outlet end and through the latter into an operating liquid tank not shown in FIG. 1.

The filling head 10 has a venting conduit portion 34, which in the example shown is substantially separate from the filling tube conduit 20. The venting conduit portion 34 of the filling head 10 ends with a coupling end 34a, to which a further conduit component, for example a tube, may be attached. A tube connected to the same, following its fluidic connection with the coupling end 34a, is also part of the venting conduit portion 34. By using or interposing a tube the venting conduit portion 34, which is provided on the filling head 10 and is preferably rigid, may be flexibly connected with a plurality of different tank containers and a plurality of different connection points on the respective containers.

The venting conduit portion 34 terminates with a venting chamber 36, which also is part of a venting arrangement 35 which is also formed by the venting conduit portion 34. Through above said gap 22 between the upper guiding tube 18a and the lower guiding tube 18b, the inner area 38 of the filling tube conduit 20 also communicates with the venting arrangement 35, more precisely with the venting chamber 36, as a portion of the same.

In the inner volume 40 of the venting chamber 36 gas from the filling tube conduit 20 and gas from a tank mix together, wherein the gas from the tank flows in the venting arrangement formed in combination with the venting conduit portion 34 or is at least located in the same.

In fact, if liquid is introduced through the filling head 10, more precisely through the filling tube conduit 20 in the direction from the inlet end 26 through the outlet end, not shown, into a tank, also not shown, this liquid which is introduced displaces a gas, which initially was present in the filling tube conduit 20 and in the tank. This gas may exit the tan through the venting arrangement 35.

In the same way, the gas from the filling tube conduit 20 may exit through the gap 22 in the inner volume 40 of the venting chamber 36 and liquid entrained by the gas in the venting arrangement 35 may return to the tank through the gap 22.

Only as a matter of completeness, it is to be noticed that the inner volume 40 of the venting chamber 36 may have an inner structure, for instance struts 42 or baffle plates 44, in order to stiffen the inner volume 40 or to shear away undesired liquid, which is entrained by gas flowing in the venting arrangement 35.

The venting arrangement 35, of which FIG. 1 shows only the portions of the ring gap 22, the venting conduit portion 34 and the venting chamber 36, further has a venting valve 46, which has a gas valve body 48 and a liquid valve body 49. The gas valve body 48 is shown in FIG. 1 in its closed position, in which it closes a venting opening and therefore an outflow end 50 of the venting conduit and therefore blocks a gas flow. The liquid valve body 49 is in its opened position.

The gas valve body 48 may be transferred by a predetermined gas overpressure in the tank from its blocking position in FIG. 1 to its passage position, in which the venting valve 46 allows the flow of gas through the outflow end 50 of the venting conduit.

Figure 2:
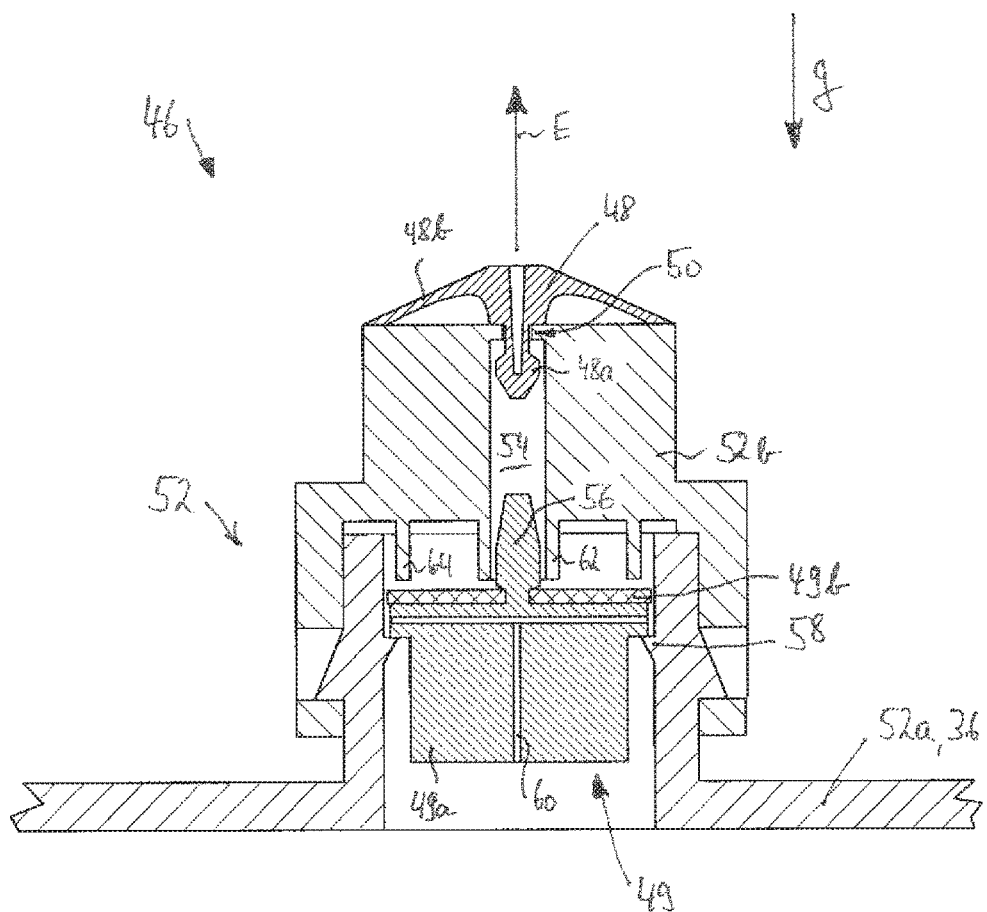
FIG. 2 shows a very schematic longitudinal sectional view of a valve arrangement of the filling head of FIG. 1 with the gas valve body in the closed position and with the liquid valve body in the open position.

FIG. 1 shows a very schematic view of the venting valve 46 with rigidly connected co-moving valve bodies, i.e. the gas valve body 48 and the liquid valve body 49. However, the valve bodies 48 and 49 are not necessarily coupled to each other for common movement between their operating positions. FIG. 2 shows a preferred embodiment of the venting valve 46, in a very schematic longitudinal section.

The venting valve 46 comprises a valve housing 52, which is preferably formed of many parts: in this case, two parts. A housing part 52a which is further downstream located in the venting direction E, may be part of the wall of the venting chamber 36 and may be integrally formed on the same. Another housing part 52b, which is in a further upstream position with respect to the venting direction E may be clipped on or otherwise latched with aforementioned housing part 52a. Housing parts 52a, 52b may additionally or alternatively be glued and/or welded to each other.

The housing part 52b, which is a separate housing component, has a portion of a valve passage 54, at whose downstream positioned end, in the venting direction E, the outflow end 50 is formed.

A portion of the gas valve body 48, which is preferably a mushroom-shaped valve body 48, passes through the outflow end 50. A thickening 48a of the gas valve body 48 securely holds the gas valve body 48 on the housing component 52b. A shield 48b of the mushroom-shaped gas valve body 48 rests on an outer side of the valve housing 52, more precisely the valve housing component 52b. The shield 48b and the thickening 48a are on different sides of the outflow end 50.

Figure 4:
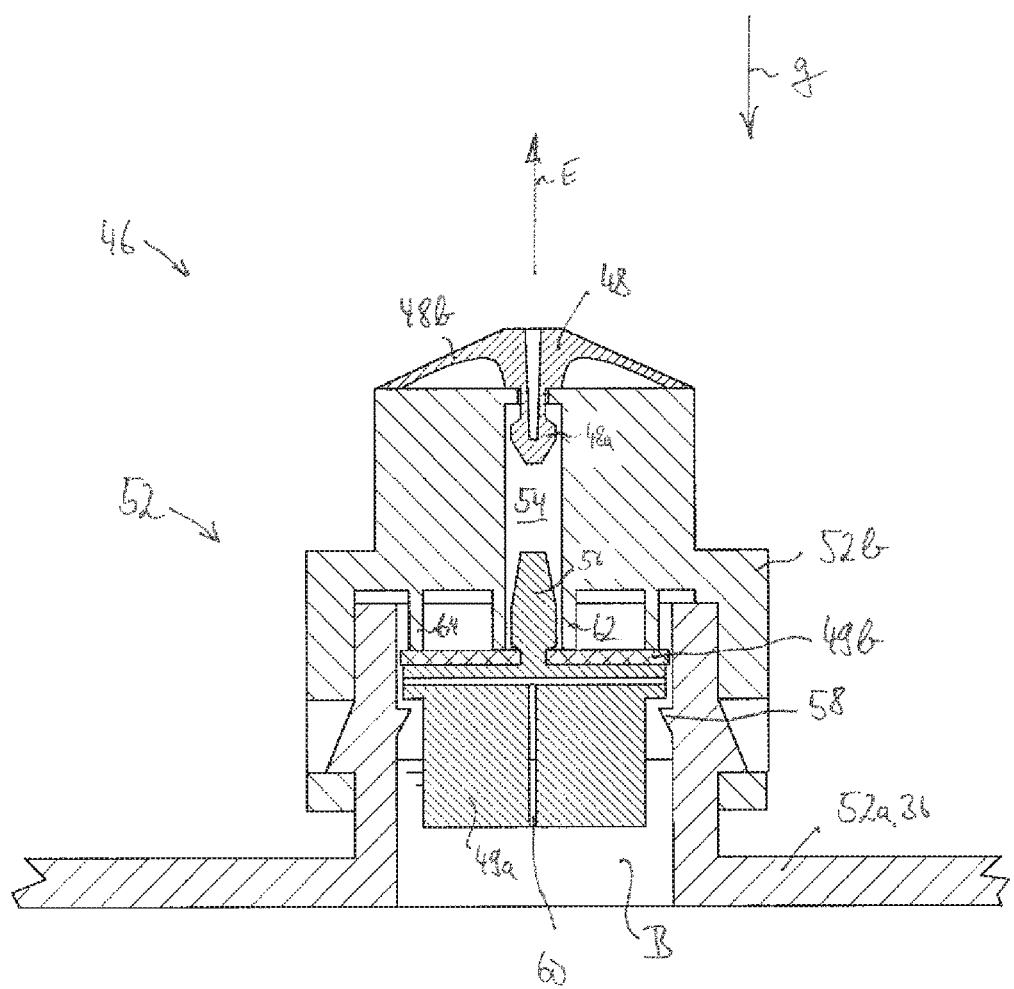

The liquid valve body 49 is preferably guided at the upstream end, in the venting direction E, of the valve passage 54 in the housing component 52b, for moving between its open position in FIG. 2 and its blocking position in FIG. 4.

The liquid valve body 49 preferably comprises a floating body 49a, on which a membrane 49b for common movement with the floating body 49a is housed.

The membrane 49b is held by a pin 56 of the floating body 49a in a secure way on the floating body 49a. The pin 56 protrudes also in the valve passage 54 into the housing component 52b and allows guiding of movement of floating body 49a. Pin 56 forms a thickening, so that the membrane 49b is securely held between the thickening of the pin 56 and the floating body 49a. The membrane 49b is made of soft elastic material, like silicon rubber, TPE, EPDM and similar, for example, and is deformable by forces due to operation.

The floating body 49a or, in general, the liquid valve body 49, may rest on a plurality of protrusions 58 in the first housing part 52a, in its open position, due to gravity, so that the liquid valve body 49 is biased by its weight along its action direction g in the opening position, which is defined by the plurality of protrusions 58. In the peripheral direction, between the individual protrusions 58, the gas may flow in the venting direction E past the liquid valve body 49 to the gas valve body 48.

In order to further facilitate this gas flow, a gas conduit 60 may be provided in the floating body 49a, which additionally provides a flow transversal section for a gas flow to the outflow end 50. The gas conduit 60 in the floating body 49a terminates in the venting direction E upstream of the membrane 49b, so that the membrane 49b is able to prevent both a gas and a liquid outflow from the outflow end 50.

A valve seat or a plurality of valve seats 62 and 64 is preferably integrally formed with the housing component 52b, which are preferably formed by protrusions, in order to provide the smallest possible resting surface for the membrane 49b on the valve seat 62 or 64. Due to the small resting surface of membrane 49b and of valve seats 62 and 64, high pressures are generated at contact points between membrane 49b and valve seats 62 and 64, which deform the soft elastic membrane 49b also with small loads due to buoyant forces of the floating body 49a, in a way that causes a complete sealing of all annular gaps between the valve seats 62 and 64 on one side and the membrane 49b on the other.

Figure 3:
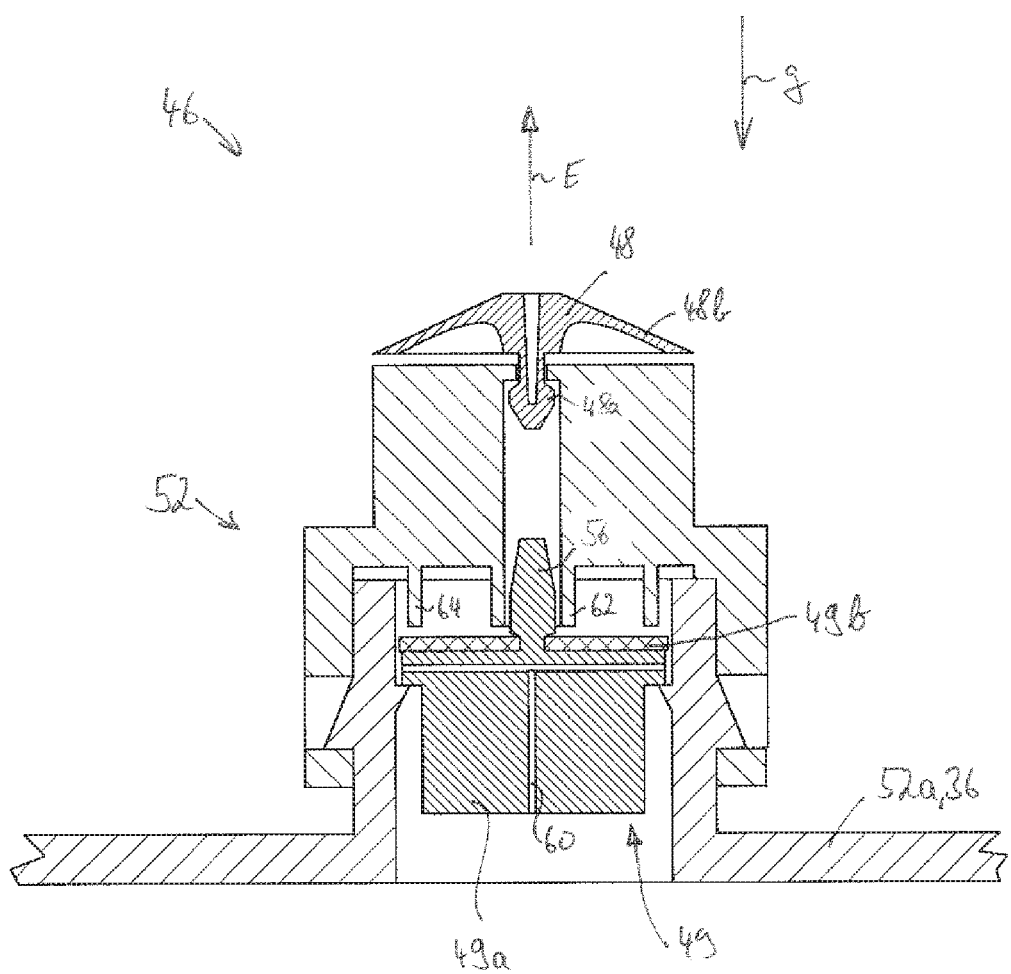
FIG. 3 shows the longitudinal sectional view of the valve arrangement of FIG. 2, in this case with the gas valve body in the passage position; and, FIG. 4 shows a very schematic longitudinal sectional view of the valve arrangement of FIG. 2, in this case with the liquid valve body in the blocking position.

FIG. 3 shows the valve arrangement of FIG. 2 with the gas valve body 48 in the passage position.

When operating liquid is loaded in the tank not shown in figures, through the filling head 10 in the filling direction F, the loaded liquid occupies a volume of the tank, which was previously occupied by gas. The compressible gas in the tank is therefore displaced, increasing its pressure. If the overpressure of the gas in the tank and therefore also in the valve passage 54 communicating with the tank volume exceeds a predetermined overpressure threshold value with respect to the ambient pressure acting on the shield 48b of the gas valve body 48, the gas valve body 48 alone through the gas overpressure is moved into the passage position, whereby gas may be exhausted reducing the overpressure in the tank. The gas valve body 58 therefore limits the value of a gas overpressure achievable in the tank. If the gas overpressure in the tank drops below the overpressure threshold value predetermined by the design of the gas valve body 48, then the gas valve body 48 is returned to its closed position of FIG. 2, due to its own weight.

A separate detection device and/or actuation device, which detects the filling of the tank and displaces the gas valve body 48 into the passage position, if necessary, is therefore not required.

A negative pressure-limiting valve may be provided in another position, which limits a gas negative pressure in the tank with respect to the ambient pressure. Such a negative pressure may be caused by a liquid removal from the tank, if no gas can simultaneously flow into the tank.

FIG. 4 shows how, due to a rising of the operating liquid B to the liquid valve body 49, due to buoyant forces, the latter is moved into its blocking position. In the blocking position, the membrane 49b rests on valve seats 62 and 64, and blocks the valve passage 54 and therefore also the outflow end 50, preventing passage of both gas and liquid.

The floating body 49a is designed, in this case, in such a way, that the volume occupied by the same—possibly considering cavities partially occupied by operating liquid B—weighs less than the same volume of operating liquid B.

The operating liquid B may penetrate in the gas conduit 60 of the floating body 49a and can nonetheless not escape from valve 46, since when the level of operating liquid B in the valve area rises, the pressure of membrane 49b against valve seats 62 and 64 also increases, therefore improving the sealing effect.

In the example shown, the valve seats 62 and 64 are annular protrusions, in a particular preferred way concentric annular protrusions.

The housing component 52b is preferably an injection molded component, as are the floating body 49a or the gas valve body 48. The membrane 49b too may be injection molded. The same holds true for the housing of the filling head.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A filling head for an operating liquid tank, in particular of a motor vehicle, comprising a filling tube with an inlet end, which, in the mounted state, lies farther away from an associated tank, and an outlet end, which, in the mounted state, lies nearer to the associated tank, wherein the filling tube is provided for conducting an associated operating liquid in a filling direction from the inlet end to the outlet end, and further comprising a venting arrangement with an inflow end, which, in the mounted state, lies nearer to the associated tank and an outflow end which, in the mounted state, lies farther away from the associated tank, which venting arrangement is provided for passing of an associated gas in a counter-flow with respect to the associated liquid flowing in the filling tube in the filling direction, in a venting direction extending from the inlet to the outflow end, wherein the venting arrangement is formed, at least in the area of its outflow end, separate from the filling tube, wherein the venting arrangement has a valve with a gas valve body, which is movable between a closed position, in which an associated gas flow in a valve passage is prevented, and a passage position based on an associated gas pressure of the associated gas within the venting arrangement, in which the associated gas may flow in the valve passage past the gas valve body, the valve having a liquid valve body, which is displaceable between a blocking position, in which an associated liquid flow in the valve passage is blocked, and an open position, in which the valve passage past the liquid valve body is open.

2. The filling head according to claim 1, wherein the gas valve body is biased towards the closed position, as a rest position, and is moveable by an associated gas overpressure of the associated gas pressure on the side of the inflow end with respect to the outflow end into the passage position and/or that the liquid valve body is biased towards the open position as a rest position and is moveable into the blocking position by the associated liquid rising to the outflow end.

3. The filling head according to claim 2, wherein the liquid valve body has a density, which is greater than the density of the associated flowing gas at 20° C. and a pressure of 1013 hPa and smaller than the density of the associated operating liquid, for the passage of which the filling head is provided, measured at a temperature of 20° C. and a pressure of 1013 hPa.

4. The filling head according to claim 3, wherein the liquid valve body has a density, which is smaller than the density of at least one of an associated aqueous urea solution, an associated gasoline, an associated super-gasoline, an associated diesel fuel, an associated cooling medium and an associated water.

5. The filling head according to claim 2, wherein at least one of the gas valve body and the liquid valve body are movable into their respective resting position by gravity.

6. The filling head according to claim 1, wherein the gas valve body and the liquid valve body are movable and displaceable, respectively, independently from each other between their respective operating positions.

7. The filling head according to claim 1, wherein the liquid valve body is located, in the venting direction, in an upstream position with respect to the gas valve body.

8. The filling head according to claim 1, wherein the gas valve body and the liquid valve body are positioned in a common valve housing.

9. The filling head according to claim 8, wherein a portion of the valve passage is formed on an integral valve housing component, wherein the valve passage portion may be blocked in a blocking region and may be closed in a closing region that is spaced from the blocking region.

10. The filling head according to claim 9, wherein the blocking region is located in a further upstream position in the venting direction and the closing region is located in a further downstream position in the venting direction.

11. The filling head according to claim 10, wherein the blocking region is on an upstream longitudinal end, through the liquid valve body, depending on its operating position and the closing region is on a downstream longitudinal end, through the gas valve body, depending on its operating position.

12. The filling head according to claim 1, wherein at least one of the gas valve body is a mushroom-shaped valve body and that the liquid valve body comprises a displaceable floating body and a membrane, which is movable by the floating body.

13. A valve arrangement with a gas valve body, which may be moved between a closed position, in which an associated gas flow in a valve passage is prevented, and a passage position based on an associated gas pressure of the associated gas flow within the valve arrangement, in which the associated gas may flow in the valve passage past the gas valve body, wherein the valve arrangement additionally has a liquid valve body, which is displaceable between a blocking position, in which an associated liquid flow in the valve passage is blocked, and an open position, in which the valve passage past the liquid valve body is open wherein the liquid valve body is biased towards the open position as a rest position and is moveable into the blocking position by the associated liquid flow rising in the valve arrangement.

14. The valve arrangement of claim 13, for a filling head for an associated operating liquid tank, in particular of an associated motor vehicle, the filling head having a filling tube with an inlet end, which, in the mounted state, lies farther away from the associated liquid tank, and an outlet end, which, in the mounted state, lies nearer to the associated tank, wherein the filling tube is provided for conducting an associated operating liquid in a filling direction from the inlet end to the outlet end, and further comprising a venting arrangement with an inflow end, which, in the mounted state, lies nearer to the associated tank and an outflow end which, in the mounted state, lies farther away from the associated tank, which venting arrangement is provided for passing of an associated gas in a counter-flow with respect to the associated liquid flowing in the filling tube in the filling direction, in a venting direction extending from the inlet to the outflow end, wherein the venting arrangement is formed, at least in the area of its outflow end, separate from the filling tube, wherein the venting arrangement includes the valve arrangement with the gas valve body.

15. A motor vehicle with the filling head according to claim 1 and with an operating liquid tank, which may be filled and vented through the filling head.

16. The filling head according to claim 2, wherein at least one of the gas valve body and the liquid valve body are movable into their respective resting position by gravity alone.

17. The filling head according to claim 8, wherein the common valve housing is composed of two or more parts.

18. The filling head according to claim 1, wherein the gas valve body is biased towards the closed position and the liquid valve body is biased towards the open position.

19. A filling head for an operating liquid tank, in particular of a motor vehicle, comprising a filling tube with an inlet end, which, in the mounted state, lies farther away from an associated tank, and an outlet end, which, in the mounted state, lies nearer to the associated tank, wherein the filling tube is provided for conducting an associated operating liquid in a filling direction from the inlet end to the outlet end, and further comprising a venting arrangement with an inflow end, which, in the mounted state, lies nearer to the associated tank and an outflow end which, in the mounted state, lies farther away from the associated tank, which venting arrangement is provided for passing of an associated gas in a counter-flow with respect to the associated liquid flowing in the filling tube in the filling direction, in a venting direction extending from the inlet to the outflow end, wherein the venting arrangement is formed, at least in the area of its outflow end, separate from the filling tube, wherein the venting arrangement has a valve with a gas valve body, which is movable between a closed position, in which an associated gas flow in a valve passage is prevented, and a passage position, in which the associated gas may flow in the valve passage past the gas valve body, the valve having a liquid valve body, which is displaceable between a blocking position, in which an associated liquid flow in the valve passage is blocked, and an open position, in which the valve passage past the liquid valve body is open, wherein the gas valve body and the liquid valve body are positioned in a common valve housing, wherein a portion of the valve passage is formed on an integral valve housing component, wherein the valve passage portion may be blocked in a blocking region and may be closed in a closing region that is spaced from the blocking region, wherein the blocking region is located in a further upstream position in the venting direction and the closing region is located in a further downstream position in the venting direction.

20. A filling head for an operating liquid tank, in particular of a motor vehicle, comprising a filling tube with an inlet end, which, in the mounted state, lies farther away from an associated tank, and an outlet end, which, in the mounted state, lies nearer to the associated tank, wherein the filling tube is provided for conducting an associated operating liquid in a filling direction from the inlet end to the outlet end, and further comprising a venting arrangement with an inflow end, which, in the mounted state, lies nearer to the associated tank and an outflow end which, in the mounted state, lies farther away from the associated tank, which venting arrangement is provided for passing of an associated gas in a counter-flow with respect to the associated liquid flowing in the filling tube in the filling direction, in a venting direction extending from the inlet to the outflow end, wherein the venting arrangement is formed, at least in the area of its outflow end, separate from the filling tube, wherein the venting arrangement has a valve with a gas valve body, which is movable between a closed position, in which an associated gas flow in a valve passage is prevented, and a passage position, in which the associated gas may flow in the valve passage past the gas valve body, the valve having a liquid valve body, which is displaceable between a blocking position, in which an associated liquid flow in the valve passage is blocked, and an open position, in which the valve passage past the liquid valve body is open, wherein at least one of the gas valve body is a mushroom-shaped valve body and that the liquid valve body comprises a displaceable floating body and a membrane, which is movable by the floating body.

* * * * *